United States Patent
Auslander

[15] 3,681,681
[45] Aug. 1, 1972

[54] ELECTRO ANALYZER WITH RECYCLE CIRCUIT FOR SIMULATED TESTING OF FURNACE CONTROL UNITS

[72] Inventor: Lee Auslander, 8100 Cobden Road, Philadelphia, Pa. 19118

[22] Filed: Nov. 23, 1970

[21] Appl. No.: 92,064

[52] U.S. Cl.............324/28 R, 324/73 R, 324/158 R, 73/1 R, 431/26
[51] Int. Cl. ............................................G01r 31/02
[58] Field of Search.........324/28 R, 73, 158; 73/1 R; 431/24, 26

[56] References Cited

UNITED STATES PATENTS 3,190,341   6/1965   Giuffrida et al.................431/24

*Primary Examiner*—Robert J. Corcoran
*Attorney*—Paul & Paul

[57] ABSTRACT

In test apparatus for testing control units used to control the operation of furnaces and the like, circuitry providing a variable voltage for checking control relay pull-in voltage, circuitry for testing impedance values of components of the furnace system, a plurality of indicator means driven by the control unit to indicate operability of a corresponding plurality of control unit circuits, temperature simulation means for simulating temperature conditions of said control unit when placed in a furnace system, a thermostat simulation circuit to simulate a thermostat system in connection with the control unit, and a recycler circuit to repetitively recycle the control unit through cycles of simulated on-off operation.

6 Claims, 4 Drawing Figures

INVENTOR.
Lee Auslander

BY *Paul + Paul*

ATTORNEYS.

3,681,681

ELECTRO ANALYZER WITH RECYCLE CIRCUIT FOR SIMULATED TESTING OF FURNACE CONTROL UNITS

BACKGROUND OF THE INVENTION

A. Field of the Invention

This invention lies in the field of test apparatus and, more particularly, apparatus for testing components of a thermostatically controlled furnace system.

B. Description of the Prior Art

In the fuel oil industry, a chronically profitless area of operation has been that of maintenance and repair of electrical controls, motors, and the like. Most companies in this business provide service contracts to their customers, which contracts are carried at a loss because of the universal inefficiency in testing, repairing, and/or rebuilding the controls, motors, and other electrical components of the fuel oil system. The instrumentation available to the on-the-job repairman is usually crude and inefficient, and ineffectual in permitting a reliable diagnosis of the system problem. As a result, many such components are replaced and rebuilt at considerable expense, when indeed the system problem lay elsewhere and no need existed for such rebuilding.

What the industry has long needed is a compact tester permitting thorough examination of the electrical components involved, and also permitting extensive examination of control operation, such examination being conducted within a short period of time. Under present procedures and with existing apparatus, there is no way to conduct an inexpensive system operation analysis within a short period of time.

SUMMARY OF THE INVENTION

It is an object of this invention to provide apparatus for the testing of thermostatic control units, motors, ignition transformers and other electrical components of automated heating systems.

It is a further object of this invention to provide apparatus for simulation of continuous and repetitive operation of a thermostatic control unit within a furnace environment.

It is a further object of this invention to provide test apparatus which is reliable and inexpensive and overcomes the shortcomings of the prior art.

Accordingly, this invention provides a receptacle for mounting therein a control unit as used in the furnace of a fuel oil heating system, a heater and a fan, each disposed in relation to the mounted control unit so as to alternately heat or cool such control unit, circuitry for switchably operating the heater and fan, a variable voltage source and connecting wires associated therewith for testing the voltage response of the control unit, motors, and other electrical components of the furnace system, connecting wires for connecting the apparatus to the terminals of the control unit to provide voltage inputs to such unit and detect signal outputs from such unit, a plurality of indicators to indicate operation of elements within such unit, DC measuring means for connecting to such unit and other components for resistance-measuring tests, and recycling circuitry for automatically recycling such control unit through successive cycles of simulated furnace system operation. In practice, the test apparatus of this invention may be used to check control units under simulated conditions of actual operation.

DETAILED DESCRIPTION OF THE DRAWINGS

Figure 1:
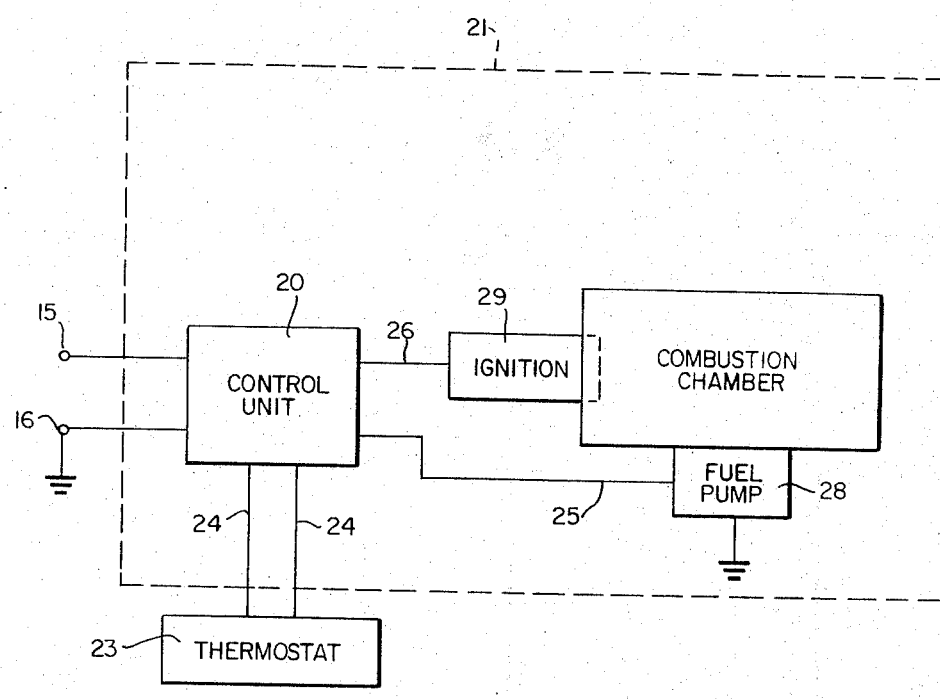
FIG. 1 is a block diagram showing a control unit as connected to a thermostat and motor in an overall heating system.

Referring now to FIG. 1, a block diagram is shown indicating the position of a standard control unit within a furnace, and the electrical signals to and from the control unit. Control unit 20 is shown placed within furnace 21, which is designated by a dashed line, the control unit having a temperature sensor within it which determines the state of the furnace, i.e., whether the furnace is on or off. Control unit 20 is connected to thermostat 23, displaced from the furnace, thermostat 23 typically providing a short circuit between leads 24 when the temperature drops below a pre-set temperature. The short circuit signal from thermostat 23 in turn activates control circuitry which places a signal on lead 25 to the fuel pump, or like motor, as well as a signal on lead 26 to the ignition transformer 29 or other ignition apparatus. The control unit is provided with a safety switch which opens to disconnect the signal to the fuel pump 28 if the temperature sensor does not detect a rise in temperature due to burning of the fuel oil, such as would occur if the ignition apparatus were not operating properly. The safety switch thus terminates operation of the furnace to avoid the dangerous condition of pumping unburned fuel oil into the interior of the burning chamber.

Burners, or furnaces, generally are of two types, i.e., a pressure gun burner, which typically ignites in several seconds, or a rotary type burner which takes about 60 seconds to achieve sustained ignition. Consequently, it is necessary that the control unit be designed to maintain ignition for at least a minute, so that it can properly initiate burning in either type burner. Accordingly, the standard control unit contains an ignition timing mechanism to maintain the ignition signal on lead 26 for at least 60 seconds.

Standard control units have a "pull-in" voltage, below which their relays pull in such that furnace operation is shut off if the available line voltage falls below a critical level. For example, in typical control units, the relay controlling the ignition circuit has pull-in in the range of 80 to 87 volts, and the relay controlling the motor has a pull-in voltage in the range of 85 to 97 volts.

Figure 3:
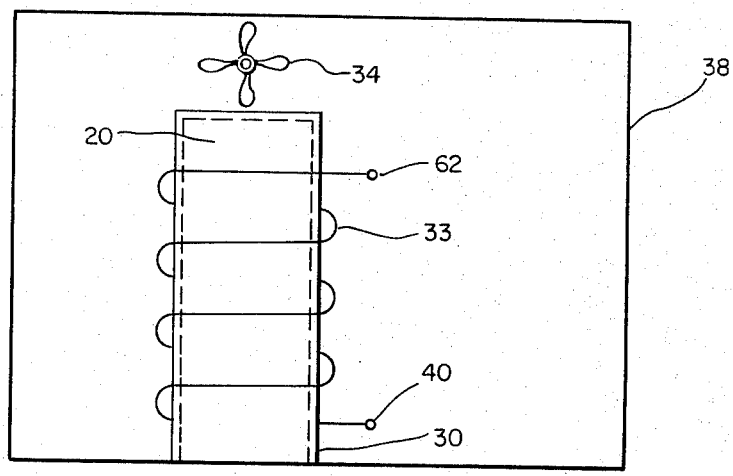
FIG. 3 is a schematic diagram showing the relationship of the fan and heater to the mounted control unit within the apparatus of this invention.
Figure 2:
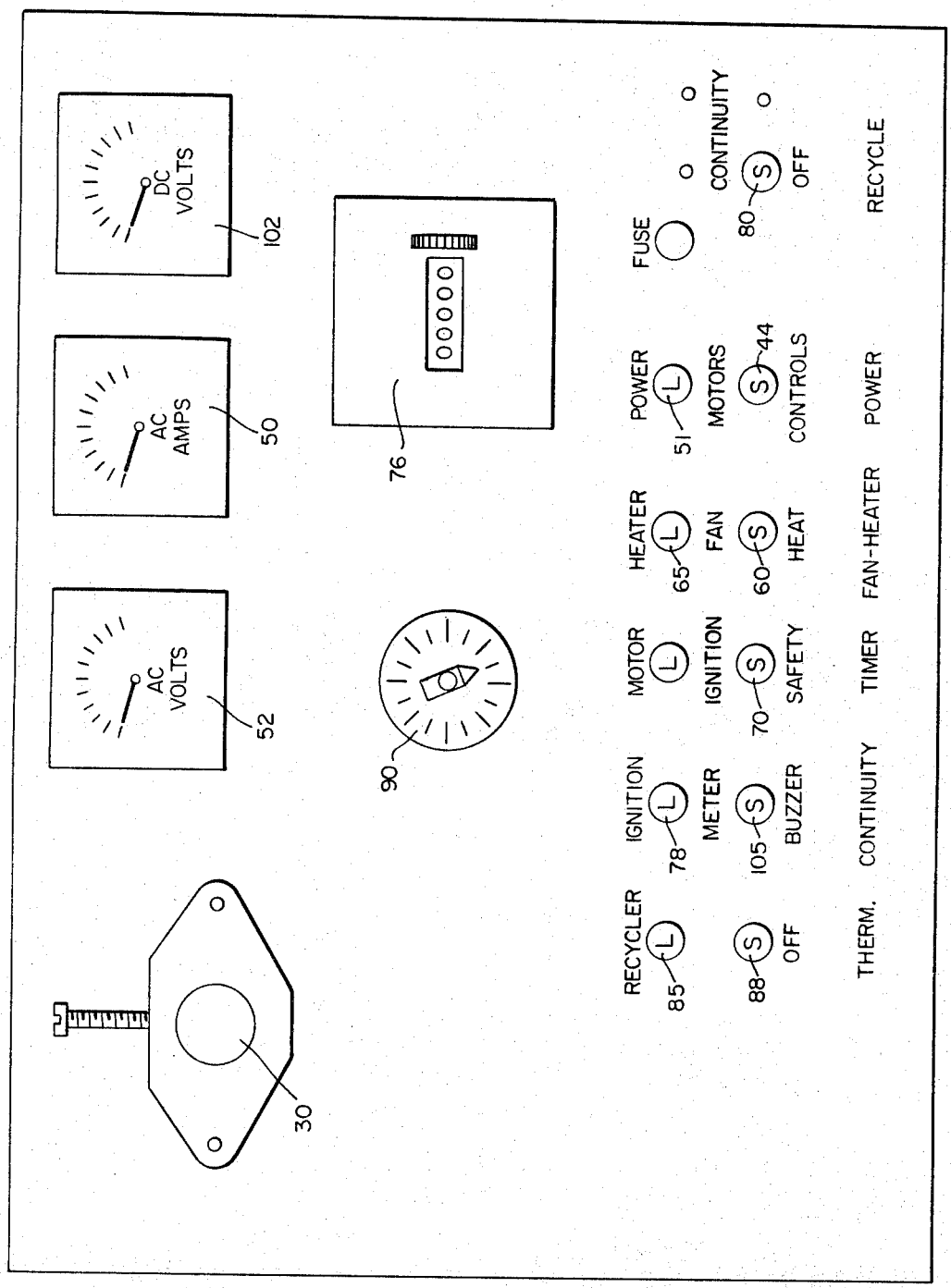
FIG. 2 shows a front view of the panel of the apparatus, showing the switches and the indicators utilized in operating the apparatus.

Referring now to FIG. 2, a front view is shown of the panel of the apparatus of this invention. A receiving inlet 30 is provided, to receive the cylindrical control unit which is to be tested. The cylindrical control unit is placed within the receiving opening 30, extending within a helical heating coil 33 as shown in FIG. 3, and being disposed adjacent to a fan 34 mounted in position to cool unit 20 when heater 33 is turned off.

Figure 4:
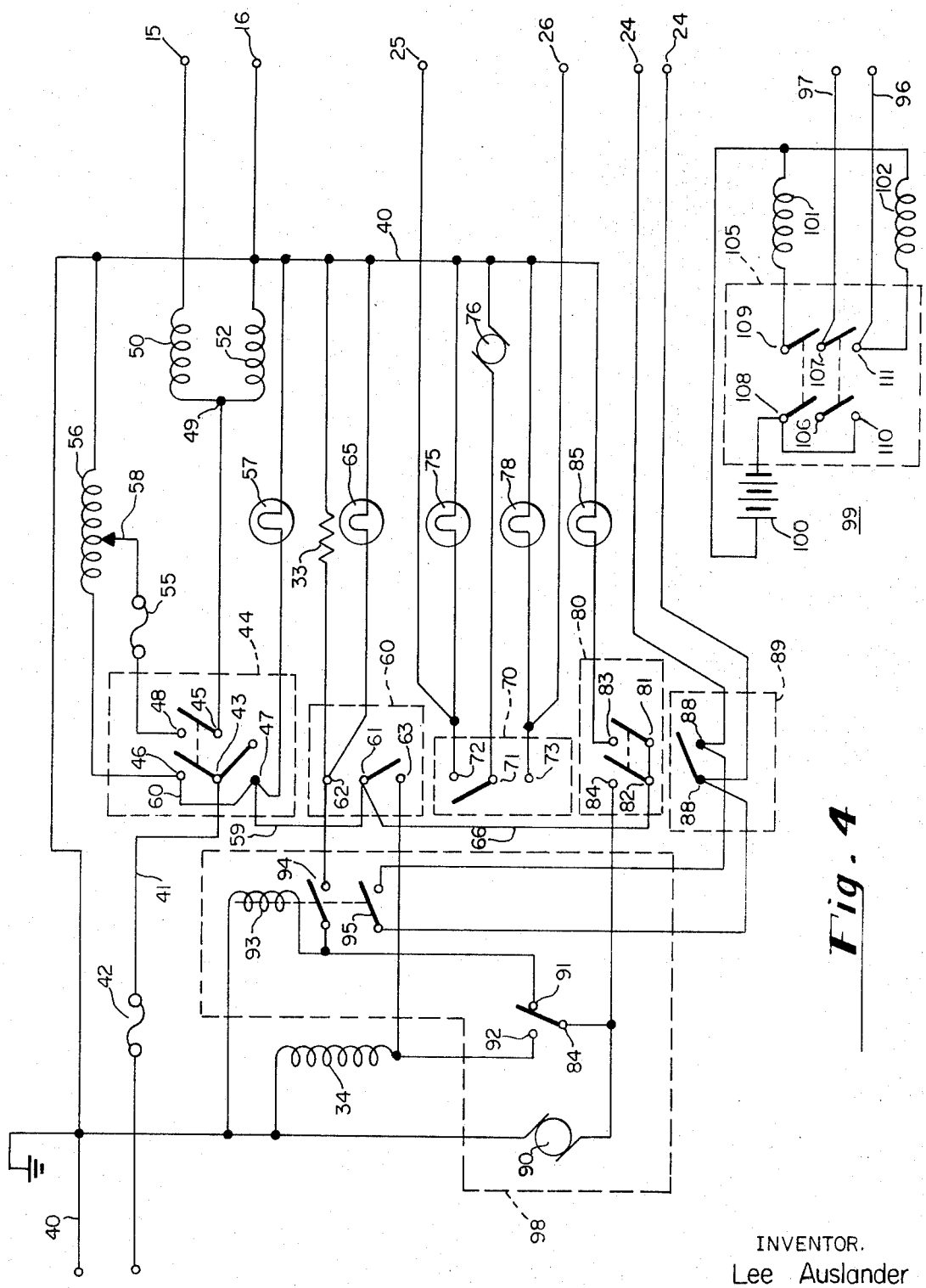
FIG. 4 is a circuit diagram of the analyzer of this invention.

Referring now to FIG. 4, a circuit diagram of the test apparatus of this invention, five leads are indicated which are used in testing the control unit 20 or other electrical components. When the control unit 20 is being tested, leads 15 and 16 of the test apparatus are connected to terminals 15 and 16 of the control unit, to provide power to it. Leads 24 on the control unit are connected to leads 24 of the tester. Similarly, the motor lead 25 is connected to lead 25 of the tester, and ignition lead 26 is connected to lead 26 of the tester.

The circuitry, housed in chassis 38, comprises input lines 40 and 41 which are connected to a conventional 110-120 volt line, line 40 being connected to ground and line 41 being hot. Line 41 is connected through a circuit breaker 42 to an input terminal 43 of switch 44. When switch 44 is in the "motor" position, terminal 43 is connected to terminal 45, which in turn is connected to a common terminal 49 of ammeter 50 and voltmeter 52. The meter faces of meters 50 and 52 are seen in FIG. 2. Ammeter 50 is connected between terminal 49 and lead 15, and voltmeter 52 is connected between terminal 49 and ground lead 40. When switch 44 is switched to the "control" position, terminal 43 is connected to terminal 46 and terminal 45 to terminal 48. Lead 60 connects terminals 46 and 47, providing power to light 57 connected between terminal 47 and ground. Terminal 46 is connected through variac coil 56 to ground, the variac having a slideable contact 58 which is connected through a fuse 55 to terminal 48 and thence to terminal 45. Thus, when in the "control" position, switch 44 causes light 57 to turn on, and provides a variable voltage at terminal 49 and on lead 15.

Terminal 47 is connected by lead 59 to terminal 61 of switch 60, thereby providing power to terminal 61 when switch 44 is in the "control" position. Switch 60 is either in the fan position, in which case terminal 61 is connected through terminal 63 to fan 34, or in the heater position, in which case terminal 61 is connected to terminal 62. When power is connected to terminal 62, heater 33 operates, and heater light 65, in parallel with heater 33, is caused to turn on.

The lead 25 is connected to terminal 72 of switch 70, and lead 26 is connected to terminal 73 of switch 70. When power is provided through unit 20 to lead 25, as when conditions call for operation of the fuel pump, safety light 75 is caused to light. When power is provided through unit 20 to lead 26, as when conditions call for ignition, ignition light 78 is caused to light. An electro-mechanical timer 76 is connected between center terminal 71 of switch 70 and ground. The timer is actuated the instant voltage appears across it, and stops operation when the voltage is removed, such that the indication on the timer represents the time duration during which voltage was across its terminals. When switch 70 is in the safety position, terminal 71 is connected to terminal 72, such that the timer operates as long as there is voltage on lead 25 and safety light 75 is on. When switch 70 is in the ignition position, terminal 71 is connected to terminal 73, such that the timer operates while voltage is on lead 26 and ignition light 78 is on.

Terminal 61 is connected through lead 66 to terminals 82 of recycle switch 80. When recycle switch 80 is placed in the on position, terminals 83 and 84 are connected to terminals 82, placing line voltage across recycle light 85. Closing of switch 80 also activates recycler circuit 98, which is described in more detail hereinbelow.

Tester leads 24, which are connected to thermostat leads 24 of control 20, are also connected to terminals 88 of thermostat switch 89, leads 24 being shorted when switch 89 is switched on. Leads 24 are also connected to contacts of switch 95 of the recycler circuit.

Another feature of the apparatus of this invention is continuity circuit 99 shown in FIG. 4. DC voltage source 100 powers buzzer 101 or ohmmeter 102 depending upon the setting of switch 105. When switch 105 is in the buzzer position, continuity leads 96 and 97 are connected in series with source 100 and buzzer 101, and when switch 105 is in the meter position, leads 96, 97 are connected in series with meter 102 and source 100.

Turning now to operation of the apparatus of this invention, the use of the various circuits above described can be appreciated by following through the steps of operation of the apparatus. By placing switch 44 in the "motor" position, line voltage is applied directly to terminal 49. By attaching leads 15 and 16 to the terminals of a motor or ignition transformer, an ammeter reading can be obtained which indicates the electrical characteristic of the component being tested. By positioning switch 44 in the "control" position, and by adjusting the variable tap 58 of the variac 56, a varying voltage is made to appear at terminal 49. When leads 15 and 16 of the test apparatus are connected to leads 15 and 16 of the control unit, the "pull in" values of the terminal relays may be checked by initially setting the variac to provide full line voltage at terminal 49, and reducing such voltage until the relays pull in. If faulty pull-in operation is detected, adjustments may be made to correct the operation.

With switch 44 in the "control" position, all aspects of the control unit 20 may be checked. Leads 15, 16, 24, 25 and 26 of the tester are connected to similar-numbered leads of the control unit. Thus, with switch 60 in the heater position, and with thermostat switch 89 placed in the on position, ignition light 78 and safety light 75 come on if unit 20 is operating properly. Heater 33 receives power, raising the temperature around the control unit to approximately 500°. The safety switch within control unit 20 may be checked by simultaneously positioning switch 70 to the "safety" position, turning switch 60 to the fan position, and turning on thermostat switch 89. Under these circumstances, the control unit ordinarily calls for power to be supplied to the heater pump for a predetermined period of time. If, after such predetermined time, the heat sensor within control unit 20 does not detect the required heat, the safety switch within unit 20 causes power to be disconnected to the pump. Under the test conditions set forth, after such predetermined period of approximately 90 seconds, unit 20 disconnects power from lead 25, in which case safety light 75 turns off. The operator watches safety light 75 as well as timer 76, timer 76 providing an accurate indication of the exact time duration before the safety switch operates. Thus, if the safety switch does not operate for a period greatly in excess of 90 seconds, this is immediately apparent, and adjustments may be made in the control unit. By repetitively running the safety switch test, the operator may adjust the safety mechanism to the desired time.

Similarly, by positioning switch 70 in the "ignition" position, the timing of the ignition circuit may be checked. In this operation, the operator places switch 44 in the "control" position, switch 60 in the "heater" position, switch 70 in the "ignition" position, and then closes switch 89, causing the control unit to produce a signal calling for ignition and operation of the heater. The duration of the ignition signal may be checked by observing timer 76.

As is well known in the art, the best way to test for the reliable operation of a control unit is to cycle it through a large number of cycles, during each of which cycles the control unit is caused to perform the functions performed during an operate-turn off cycle. Recycler circuit 98 is designed to automatically operate control unit 20 through a large number of such cycles. When switch 80 is placed in the on condition, power is placed across clock unit 90 causing operation of the clock to commence. Clock 90 may be any commercially available clock-activated switch. Power is also placed across relay coil 93 through normally closed contacts 84 and 91, causing contact pairs 94 and 95 to close, in turn causing operation of heater 33 and shorting of thermostat leads 24. Shorting leads 24 causes the control unit, presuming that it is operating normally, to place power on leads 25 and 26, causing operation of the heater 33 and lighting of ignition light 78. After a time period determined by clock 90, being nominally 3½ minutes, contact 84 is disconnected from contact 91 and placed in contact with terminal 92, initiating operation of fan 34. At the same time, power is removed from relay coil 93, terminating operation of heater 33 and open circuiting leads 24. Clock 90 maintains this condition for a period of nominally 4 minutes, after which period contact 84 is reset and placed in contact with contact 91, and the cycle is repeated. If, at any time during one of the cycles, the safety switch falsely operates, it remains in the off condition until reset, and such false operation may be detected. Thus, the operator of the analyzer of this invention may place the unit on recycle operation for an extended period of time, e.g., 24 hours, and take it through as many operations as the control unit would actually get in a month or more when installed in the field.

The continuity circuit 99 may be used to check for short circuits in motors, transformers, and the like, by switching switch 105 to the buzzer position, the buzzer providing an indication when a short circuit is present. By switching switch 105 into the meter position, a reading of DC resistance between any two terminals may be obtained.

I claim:

1. Apparatus for automatic testing of a thermostatic control unit which is designed to control the operation of a furnace in which it is normally housed, which unit has input leads for receiving electrical power, output leads for transmitting control signals, and thermostat leads for connection to an external thermostat, comprising:

a. support means for supporting said control unit while it is removed from said furnace and being tested;

b. heating means, positioned adjacent said control unit when supported in said support means, for heating said control unit to a predetermined temperature;

c. fan means, positioned operatively adjacent to said control unit when supported in said support means, for cooling said control unit;

d. indicator means, having a plurality of indicator lamps for representing the presence of respective electrical control signals transmitted from said control unit;

e. thermostat simulation means, for simulation of an external thermostat unit, being adapted to provide a closed circuit across said thermostat leads;

f. a source of electrical power;

g. connecting means, for connecting said electrical power source to said input leads, for connecting said output leads to said indicator means, and for connecting said thermostat leads to said thermostat simulation means; and h. recycling means for repetitively recycling said control unit through simulated cycles of operation, having a relay and a clock actuated switch, said clock actuated switch having a first time period during which it is in a first position causing activation of said relay which in turn causes said thermostat simulation means to provide a closed circuit across said thermostat leads and activates said heating means so as to simulate heating of said furnace, and having a second time period during which said switch is in a second position deactivating said heating means and said thermostat simulation means and activating said fan means so as to simulate cooling off of said control unit, after which said clock switch returns to its first position and the cycle is repeated, whereby said control unit may be repetitively tested so that an electrical fault within said control unit may be detected by observation of said indicator means.

2. The apparatus as described in claim 1, comprising manually operated heater switching means, for alternately activating said heater means and said fan means, whereby said control unit connected to said test apparatus may be manually tested through an operating cycle.

3. The apparatus as described in claim 2, wherein said indicator means has a timer unit adapted to be connected to one of said control unit output leads, for timing the duration of the control signal appearing on said one lead.

4. The apparatus as described in claim 3, wherein said control unit has a safety control switch to control a furnace system having a fuel pump, for de-energizing said fuel pump when the fuel being pumped is not ignited, and comprising a safety light connected to that one of said control unit output leads which carries power for energizing said pump, to enable monitoring of the operation of said safety switch.

5. The apparatus as described in claim 4, wherein said control unit is adapted to control an ignition transformer in said furnace by generating an ignition signal which is coupled to a second of said output leads, and having an ignition light connected by said connecting means to said second output lead.

6. The apparatus as described in claim 5, comprising a timer switch for switchably connecting said timer to said safety light and said ignition light.

* * * * *